United States Patent [19]
Gray et al.

[11] 3,744,690
[45] July 10, 1973

[54] CUTTING GLASS

[75] Inventors: Martin Ernest Gray, Liverpool;
Dennis William Whittaker, St. Helens; David Appleton, Warrington, all of England

[73] Assignee: Pilkington Brothers Limited, Liverpool, England

[22] Filed: Mar. 17, 1972

[21] Appl. No.: 235,697

[52] U.S. Cl.................... 225/2, 225/93, 225/96.5
[51] Int. Cl. ............................................ B26f 3/00
[58] Field of Search ............. 225/2, 96.5, 1, 93; 29/413

[56] References Cited
UNITED STATES PATENTS
1,895,779  1/1933  Aurien et al.................... 225/2
1,932,149  10/1933  Smith............................ 225/2
1,959,545  5/1934  Paxton........................... 225/2

*Primary Examiner*—Frank T. Yost
*Attorney*—Richard C. Sughrue, Robert J. Seas, Jr. et al.

[57] ABSTRACT

Apparatus for cutting reinforced glass sheet material having elongated reinforcing members extending across the cutting line, comprises cutting means for cutting the glass material along the required cutting line and severing means for severing the reinforcing members by effecting repeated vibratory movement of the glass on one side of the cutting line relative to the glass on the other side of the cutting line, the movement being parallel to the cutting line and in the plane of the sheet material.

11 Claims, 5 Drawing Figures

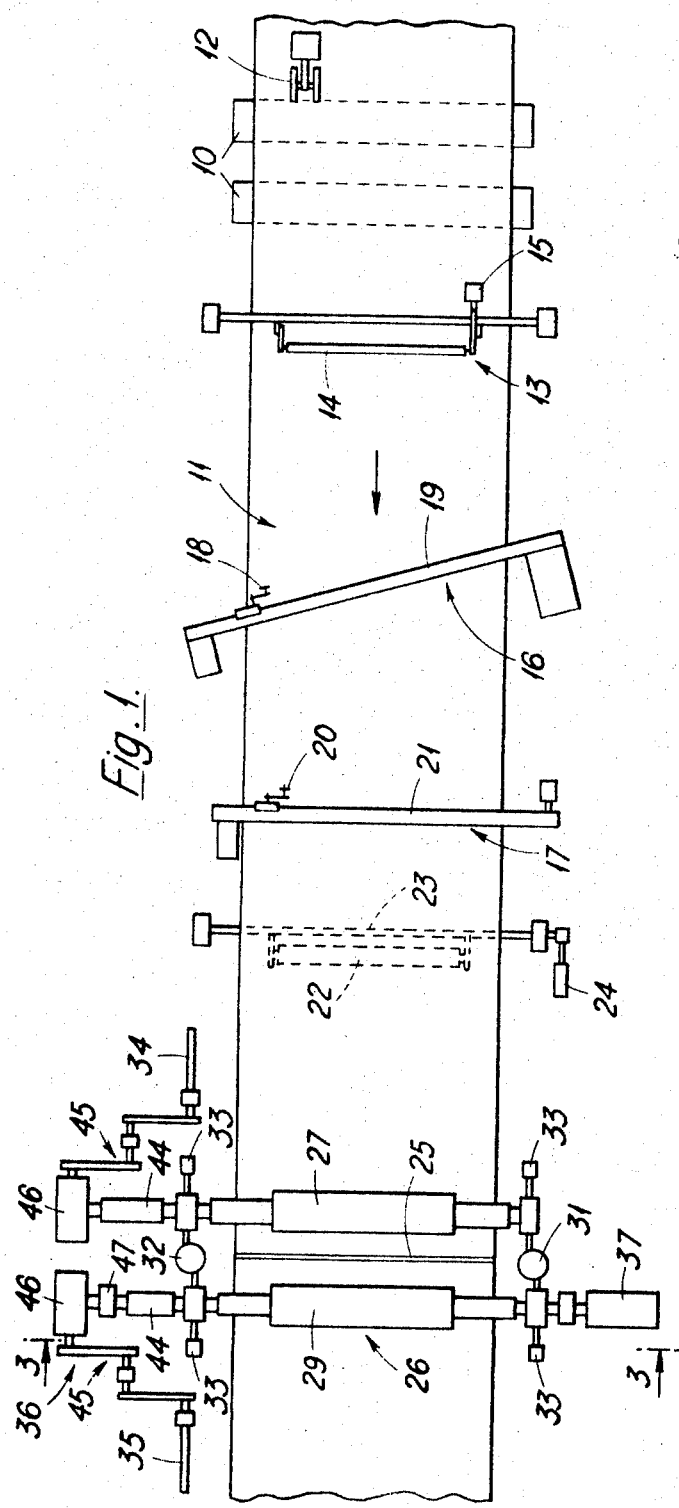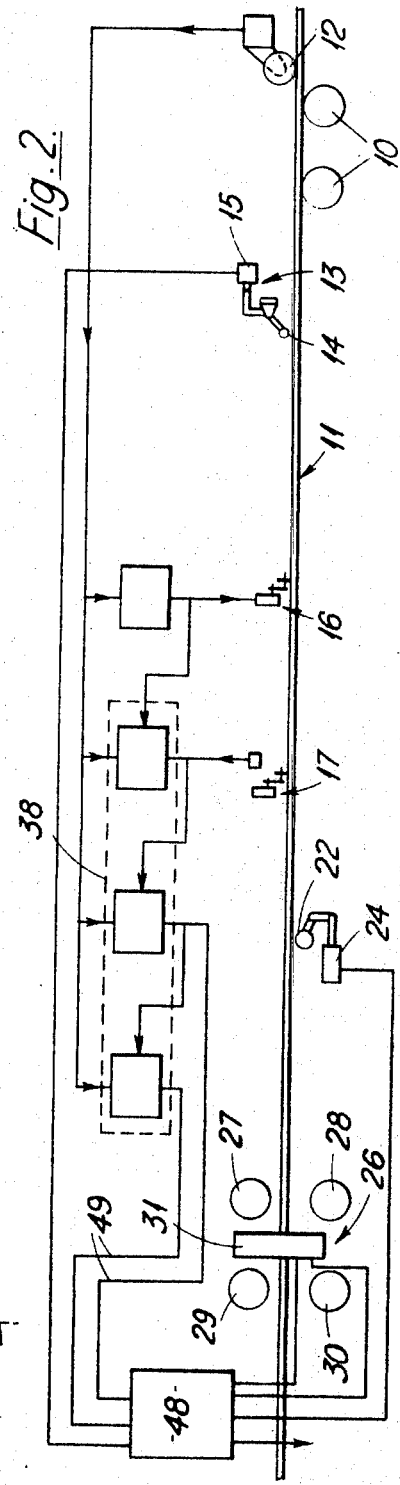

CUTTING GLASS

BACKGROUND OF THE INVENTION

The invention relates to methods of and apparatus for cutting reinforced glass sheet material.

When cutting reinforced glass sheet material, the glass itself can be cut by conventional techniques but difficulties remain in severing reinforcing members which extend across the cut and link the two parts of the sheet material on opposite sides of the cutting line. It is known to sever wires in wired glass by effecting relative movement between the glass on opposite sides of the line of cut, in a direction perpendicular to the plane of the glass. However difficulties commonly occur due to wire ends projecting from the cut edge of the glass and reduction in diameter of the wire inside the glass near the cut edge. This can lead to corrosion damage within the glass. The present invention is concenred with the provision of improved methods and apparatus for cutting such glass sheet material and severing the reinforcing members.

SUMMARY OF THE INVENTION

The present invention provides a method of cutting reinforced glass sheet material having elongated reinforcing members extending arcross the cutting line, which method comprises cutting the glass material along the required cutting line and subsequently severing said reinforcing members by effecting relative movement between the two parts of the sheet material on either side of the cutting line in a direction parallel to the cutting line and in the plane of the sheet material. Preferably the relative movement of the two parts is effected in two opposite directions.

To achieve quick and effective severing of the reinforcing members it is preferred that the relative movement of the two parts is repeated vibratory movement in two opposite directions parallel to the cutting line while the two parts are maintained in a single plane.

The invention also provides apparatus for cutting reinforced glass sheet material having elongated reinforcing members extending across the cutting line, which apparatus comprises cutting means for cutting the glass material along the required cutting line and severing means for severing the reinforcing members which severing means comprises means for effecting relative movement between the two parts of the sheet material on either side of the cutting line in a direction parallel to the cutting line and in the plane of the sheet material.

BRIEF DESCRIPTION OF THE DRAWINGS

FIG. 1 is a schematic plan view of apparatus embodying the present invention for cutting reinforced glass, FIG. 2 is a schematic side elevation of the apparatus shown in FIG. 1.

DESCRIPTION OF THE PREFERRED EMBODIMENT

Figure 3:
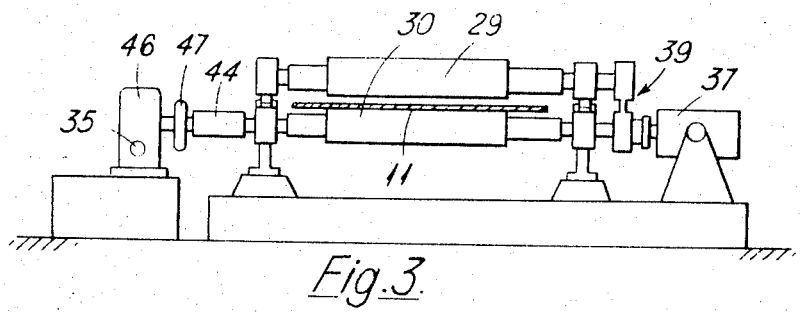
FIG. 3 is a section on the line 3—3 in FIG. 1, and FIGS. 4 and 5 are enlarged views of parts of the apparatus shown in FIGS. 1, 2 and 3.

The apparatus of this example is arranged for cutting required lengths off a continuously advancing ribbon 11 of reinforced glass sheet material. The reinforcement consists of a lattice of wires embedded in the glass, at least some of the wires extending along the length of the ribbon, i.e., perpendicular to the cutting line across the ribbon.

As shown in FIGS. 1 and 2, the ribbon moves from right to left on conveyor rollers 10 (only some of which are shown in FIGS. 1 and 2) and first passes a digitiser 12. The digitiser 12 has a rubber covered wheel which rests on the glass and is driven through friction by the movement of the glass below it. As it rotates it generates electrical pulses indicating the extent of movement of the ribbon. Next, the ribbon passes a detector 13 which includes a rubber covered roller 14 pivotally mounted approximately half an inch above the glass surface. If a surface irregularity of more than half an inch passes the detector 13, the roller 14 is raised by the glass irregularity and operates a microswitch 15.

In the particular apparatus shown, two alternative cutters 16 and 17 are shown. The cutter 16 has a cutting wheel 18 movable along a fixed support 19 arranged at an angle to the length of the ribbon 11, so as to compensate for the movement of the ribbon. The cutting wheel 18 is moved along the support at a suitable speed so as to form a straight score line across the surface of the ribbon perpendicular to the edge of the ribbon. Instead of using the cutter 16, the cutter 17 may alternatively be used. This has a cutting wheel 20, similar to the wheel 18, movable along a frame 21. The frame 21 is arranged perpendicular to the edge of the ribbon and is adapted to be moved forwards by the ribbon at the same speed as the ribbon while the cutting wheel 2o moves across the frame 21. In this way, the wheel 20 forms a score line across the surface of the ribbon perpendicular to the edge of the ribbon. After formation of the score line, the frame 21 is disengaged from the ribbon and moves back to its rest position.

After formation of the score line by either the cutter 16 or 17, the ribbon moves over a snapping roller 22. The roller 22 is rubber covered and is cantilevered on a shaft 23 extending across and below the ribbon. An hydraulic piston device 24 is arranged to raise the roller 22 when the score line is immediately above the roller 22 so as to apply stress and break open the score line. In this way, a cut 25 is formed through the glass material although the reinforcing wires which extend along the ribbon extend across the cut and are not yet severed. To sever these wires, the ribbon passes to a vibration shearing device 26. This includes a first pair of rollers 27 and 28, one above the ribbon and the other below the ribbon, and a second pair of rollers 29 and 30 similarly arranged one above and one below the ribbon 11. The two pairs of rollers are rubber covered and span the ribbon. The two pairs of rollers are, in this particular example 12-inches apart.

Figure 4:
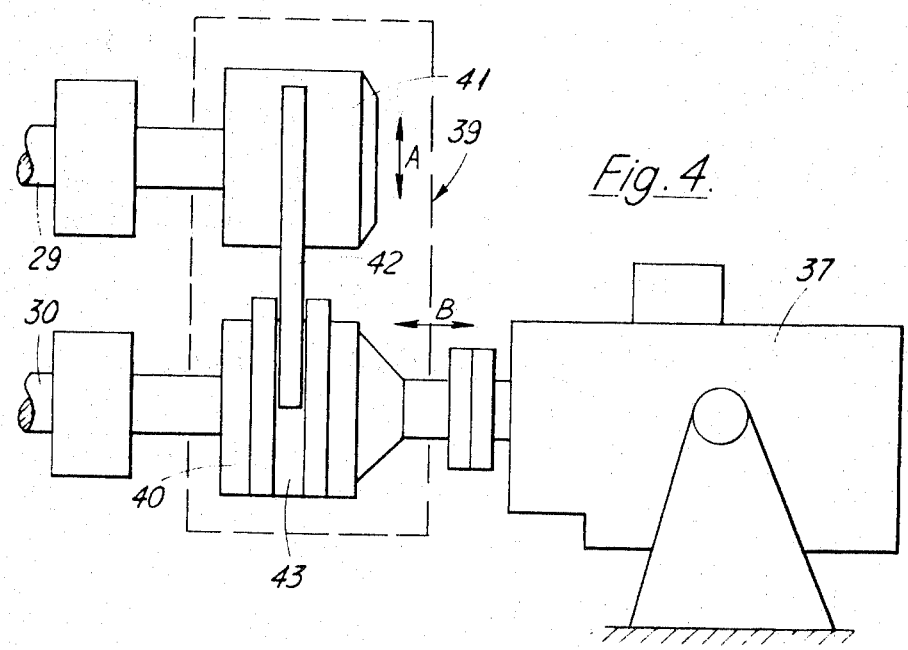
Figure 5:
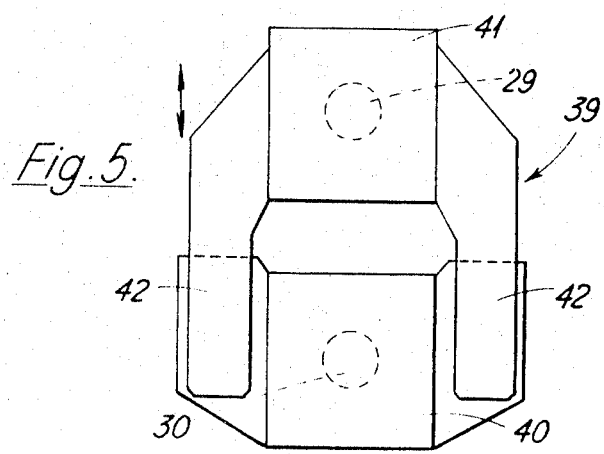

The two bottom rollers 28 and 30 are continuously driven from drive shafts 34 and 35 which drive the conveyor supporting the ribbon. The upstream roller 28 has the same peripheral speed as the conveyor rollers and the downstream roller 30 a slightly faster peripheral speed than the conveyor rollers. This slight difference ensures that the two surfaces of the cut being processed do not rub together when the vibration action takes place, i.e., it parts the two surfaces slightly as the vibration action takes place and thus prevents damage to the cut edges. The uppermost surfaces of the two bottom rollers 28, 30 are approximately one-sixteenth inch above the conveyor rollers and support the glass at all times. The two rollers 27 and 29 above the glass are arranged to rotate freely. They also move in a vertical direction and clamp the glass between themsleves and the two rubber covered rollers 28 and 30 under the glass. The clamping action is performed by hydraulic cylinders 31 and 32 attached to both sides of the upper rollers 28 and 29 which are pivotally supported by supports 33 at each end. These hydraulic cylinders 31, 32 impart two alternative movements to the upper rollers. A half inch movement downwards when they clamp the glass and a 3-inch movement upwards when any obstruction comes along on the ribbon or when the shearer is not being used. Under normal operating conditions the two upper rollers 27, 29 are approximately one-fourth inch above the glass. This will vary slightly depending on the thickness of glass being made. When a shearing operation takes place the two rollers 27, 29 are pulled down onto the glass by the short stroke of the hydraulic cylinders 31 and 32. If however an irregularity in the glass greater than one half-inch comes on the ribbon, the detector 13 upstream of the shearer operates the 3-inch stroke of the hydraulic cylinders which push the two rollers 27, 29 up out of the way of the obstruction. This upward stroke can also be operated manually from a control panel. The upstream pair of rollers 27, 28 are rigidly constrained in their axial direction whilst the downstream pair 29, 30 are able to move axially in their bearings whilst rotating. Conected to the downstream pair of rollers 29, 30 on the opposite side of the ribbon to the rotary drive mechanism 36 is an oil hydraulic vibration actuator 37. This actuator 37 generates vibratory motion the Connected amplitude and duration of which can be closely controlled from an electronic oscillator and control unit 38. The coupling of the actuator 37 to the downstream pair of rollers is via a vibration transmission unit 39 (see FIGS. 4 and 5). This unit 39 consists of two ball bearing units 40 and 41, one on the end of each of the downstream pair of rollers. The housing of the bearing unit 40 on the bottom roller 30 is rigidly connected to the vibration actuator 37 whilst the housing of the bearing unit 41 on the upper roller 29 is connected to the housing of the bottom roller bearing through a forked tongue 42 on the upper housing engaging a slot 43 on both sides of the housing of the lower bearing 40. This arrangement allows the upper roller to rotate and move at right angles to its axis of rotation as shown by arrow A, whilst rotating, and it also transmits the vibration in the direction of the arrow B from the bottom to the top roller via the tongue 42 and slot 43. The drive to the bottom rollers 28, 30 from the shafts 34 and 35 is via isolation clutches 45, reduction gear boxes 46 and universal coupling drive shafts 44. Incorporated into the drive system to the vibrating pair of rollers 29, 30, between the reduction gear box 46 and the universal coupling drive shaft 44, is a resilient rubber coupling 47. This coupling 47 reduces the vibration transmission back to the reduction gear box 46. Axial movement is also taken up in a sliding spline arrangement of the universal coupling drive shaft 44. The rubber covering on all four rollers 27, 28, 29 and 30 is less than the width of the glass ribbon 11 being processed. This is because at times the edges of the ribbon may not be uniform, i.e., the thickness and shape of the edges can vary considerably and such edge faults could severly damage both the rubber covering of the rollers and the glass if the rubber extended to the edges of the ribbon.

The control unit 38 includes a number of electronic counters coupled to the digitiser 12 and microswitches on the cutters 16 and 17. The control unit 38 has output lines 49 connected to a hydraulic pump 48 which in turn operates the hydraulic pistons 24, 31 and 32 and the vibration actuator 37. The control unit 38 receives an indication of the speed of movement of the ribbon 11 and controls the times of the various operations on the ribbon 11 so that a satisfactory cut is achieved at the correct position across the ribbon.

It will be appreciated that when the cut line 25 is in the required position between rollers 27 and 29, the roller pair 27, 28 is moved to grip the glass sheet and prevent movement of the glass in a direction along the axes of the rollers. At the same time, the rollers 29 and 30 are moved to grip the part of the glass sheet to be separated and are then vibrated at high frequency, (e.g., at about 20 cycles per second) so as to fatigue and sever the wires bridging the cut. During this operation of severing the wires, the two parts of the glass sheet being separated continue to be supported by rollers in a single plane so that the portion of the glass sheet being cut off is moved back and forth in a direction parallel to the cut line 25 in the plane of the ribbon 11.

In the particular example described, the vibration actuator is servo controlled to give a wide range of frequencies and amplitudes of vibration. The particular frequency, amplitude and duration of the vibrations used to make a cut is selected to suit the wire conditions, i.e., number and diameter of wires, in the glass sheet being cut. In the case of a ribbon of approximately 80 inches width having wires of eighteen-thousandths of an inch diameter at a pitch of one-half inch across 74 inches of the ribbon width, it has been found satisfactory to operate the actuator 37 at a frequency of 20 c/s to produce vibrations of between 0.05 inch and 0.06 inch amplitude for a duration of 1 second, to achieve satisfactory severing of the wires. A gain control device is provided to adjust the force exerted by the actuator. This can be adjusted to suit the glass being cut. The apparatus described above may be used to cut various wire patterns within the glass, including "Georgian" wired glass (in which the wires run parallel to and perpendicular to the edges of the ribbon) and "Diamond" wired glass (in which the wires run at about 45° to the edge of the ribbon and thereby to the line of cut). In cutting "Diamond," a greater shearing force is required due to the greater cross sectional area of each wire along the line of cut.

The apparatus described above provides an effective way of cutting reinforced glass sheet material and provides an improved quality of cut edge. Due to the wire severing system, the ends of the wire reinforcement project only slightly, if at all, from the cut edges. Furthermore, the diameter of the wire inside the glass near the cut edges is not unduly reduced and this reduces the liklihood of corrosion damage within the glass. The wire shearing system can be arranged to avoid contact with, and possible damage to, the ribbon edges and so glass wastage can be reduced. The cutting system can run automatically, repeatedly cutting off desired lengths once the control apparatus has been pre-set to the required lengths.

The invention is not restricted to the details of the foregoing example. In particular, the dimensions given are clearly by way of one example only. Furthermore, the invention can be used for dividing individual sheets of wired glass into separate portions, as well as cutting lengths off an advancing ribbon of glass as specifically described with reference to the drawings. The same apparatus can be used for dividing individual sheets, the conveyor advancing spaced sheets past the cutting and severing stations instead of advancing a continuous ribbon.

We claim:

1. A method of cutting reinforced glass sheet material having elongated reinforcing members extending across the cutting line, which method comprises cutting the glass material along the required cutting line and subsequently severing said reinforcing members by effecting relative movement between the two parts of the sheet material on either side of the cutting line in a direction parallel to the cutting line and in the plane of the sheet material.

2. A method of cutting as claimed in claim 1 in which the relative movement of the two parts is repeated vibratory movement in two opposite directions parallel to the cutting line while the two parts are maintained in a single plane.

3. A method of cutting as claimed in claim 1, in which the two parts of the sheet material are moved relative to each other in a direction perpendicular to the cutting line and in the plane of the sheet material before effecting the relative movement parallel to the cutting line so as to form a small gap between the two parts.

4. A method of cutting required lengths off an advancing ribbon of reinforced glass sheet material, which method comprises cutting the glass material along the required cutting line and severing the reinforcing members as claimed in claim 1.

5. Apparatus for cutting reinforced glass sheet material having elongated reinforcing members extending across the cutting line, which apparatus cutting means cuttinmeans for cutting the glass material along the required cutting line and severing means for severing the reinforcing members which severing means comprises means for effecting relative movement between the two parts of the sheet material on either side of the cutting line in a direction parallel to the cutting line and in the plane of the sheet material.

6. Apparatus as claimed in claim 5 in which the severing means includes first holding means arranged to hold one of said parts of the sheet material and prevent movement parallel to the cutting line and second holding means arranged to hold the other of said parts and move it in said direction parallel to the cutting line while the two parts remain in a common plane.

7. Apparatus according to claim 6 in which each holding means includes a pair of rollers, one of each pair being above and the other below the associated part of the sheet material, together with means for urging the rollers of each pair towards each other to grip the sheet material.

8. Apparatus according to claim 5 in which the severing means is arranged to effect relative movement of the said two parts of the sheet material in two opposite directions.

9. Apparatus according to claim 8 in which the severing means includes a vibratory device arranged to effect repeated vibratory movement in opposite directions parallel to the cutting line in the plane of the sheet material.

10. Apparatus according to claim 5 in which a conveyor is provided for continuously advancing the sheet material to be cut and means is provided to advance the downstream part of the sheet material relative to the upstream part after the glass material has been cut and before the severing means is operated to sever the reinforcing members so as to provide a small gap between the two parts.

11. Apparatus according to claim 5 in which the said cutting means comprises a scoring device for scoring the surface of the glass sheet material along the cutting line and means for applying stress across the line of scoring to effect a cut along the line.

* * * * *